United States Patent
Bondarevsky et al.

(10) Patent No.: US 12,012,866 B1
(45) Date of Patent: Jun. 18, 2024

(54) NON-CIRCULAR STRESS REDUCING CROSSOVER

(71) Applicant: Raytheon Technologies Corporation, Farmington, CT (US)

(72) Inventors: Dana K. Bondarevsky, Sturbridge, MA (US); Christopher Corcoran, Planstville, CT (US); Bryan P. Dube, Chepachet, RI (US); Yuta Yoshimura, Meriden, CT (US); David D. Chapdelaine, Ellington, CT (US); Christopher Paul Perron, Tolland, CT (US)

(73) Assignee: RTX Corporation, Farmington, CT (US)

(*) Notice: Subject to any disclaimer, the term of this patent is extended or adjusted under 35 U.S.C. 154(b) by 0 days.

(21) Appl. No.: 18/208,684

(22) Filed: Jun. 12, 2023

(51) Int. Cl.
*F01D 5/18* (2006.01)

(52) U.S. Cl.
CPC .......... F01D 5/18 (2013.01); *F05D 2260/20* (2013.01)

(58) Field of Classification Search
CPC .......... F01D 5/186; F01D 5/187; F01D 25/12; F01D 5/147; F01D 5/20; F01D 9/065; F01D 5/141; F01D 5/188; F01D 9/02; F01D 5/18; F01D 9/041; F01D 5/081; F01D 5/085; F01D 5/182; F01D 5/183; F05D 2260/20; F05D 2260/202; F05D 2260/201; F05D 2240/303; F05D 2220/32; F05D 2240/81; F05D 2250/14; F05D 2260/2212; F05D 2240/121; F05D 2240/307; F05D 2260/22141; F05D 2240/12; F05D 2240/305; F05D 2240/122; F05D 2240/125; F05D 2240/304; F05D 2240/306; F05D 2250/52; F05D 2250/70; F05D 2250/71; F05D 2250/292; F05D 2250/141; F05D 2250/314; F05D 2240/30; F05D 2240/301; F05D 2250/184; F05D 2250/16; F05D 2250/232; F05D 2250/24; F05D 2250/26; F05D 2250/231; F05D 2260/203; F05D 2260/2214; F04D 29/324; F04D 29/023; F04D 29/083
See application file for complete search history.

(56) References Cited

U.S. PATENT DOCUMENTS

| | | | |
|---|---|---|---|
| 5,096,379 A | * | 3/1992 | Stroud ............ F01D 5/186 29/889.721 |
| 5,403,159 A | | 4/1995 | Green et al. |
| 6,595,748 B2 | | 7/2003 | Flodman et al. |
| 7,104,757 B2 | | 9/2006 | Gross |

(Continued)

*Primary Examiner* — Eric J Zamora Alvarez
(74) *Attorney, Agent, or Firm* — Kinney & Lange, P.A.

(57) ABSTRACT

An airfoil for a gas turbine engine is configured to extend in a radial direction relative to an engine axis from an inner diameter to an outer diameter. The airfoil comprises a body having a base disposed at the inner diameter, a tip disposed at the outer diameter, a leading edge, a trailing edge, and pressure and suction side walls extending between the leading edge and the trailing edge and between the base and the tip. The body defines an interior cavity. A first wall is disposed in the interior cavity, extends radially, and adjoins the pressure side wall and the suction side wall to form a first cooling channel. A first hole through the first wall connects the first cooling channel to a second cooling channel. The first hole has a profile that tapers inward toward the base.

18 Claims, 5 Drawing Sheets

(56) References Cited

U.S. PATENT DOCUMENTS

| | | | |
|---|---|---|---|
| 7,766,619 B2* | 8/2010 | Fokine | F01D 5/187 416/97 R |
| 8,657,576 B2* | 2/2014 | Tibbott | F01D 5/187 416/96 R |
| 9,394,798 B2 | 7/2016 | Crites et al. | |
| 10,190,420 B2* | 1/2019 | King | B22C 9/103 |
| 10,683,763 B2* | 6/2020 | Halfmann | F01D 5/188 |
| 10,718,219 B2 | 7/2020 | Meier et al. | |
| 2022/0178261 A1* | 6/2022 | Fanelli | F01D 5/18 |

* cited by examiner

NON-CIRCULAR STRESS REDUCING CROSSOVER

STATEMENT OF GOVERNMENT INTEREST

This invention was made with Government support and the Government has certain rights in this invention.

BACKGROUND

The present invention relates generally to cooling components of gas turbine engines and more particularly to airfoil cooling circuits.

Hollow airfoils of a turbine section of a gas turbine engine can require internal structures to achieve a desired cooling air flow while reducing stress concentrations. Improved cooling circuits and structures are needed to address both heat transfer and stress reduction.

SUMMARY

An airfoil for a gas turbine engine is configured to extend in a radial direction relative to an engine axis from an inner diameter to an outer diameter. The airfoil comprises a body having a base disposed at the inner diameter, a tip disposed at the outer diameter, a leading edge, a trailing edge, a pressure side wall extending between the leading edge and the trailing edge and between the base and the tip, and a suction side wall extending between the leading edge and the trailing edge and between the base and the tip. The body defines an interior cavity. A first wall is disposed in the interior cavity, extends radially, and adjoins the pressure side wall and the suction side wall to form a first cooling channel. A first hole through the first wall connects the first cooling channel to a second cooling channel. The first hole has a profile that tapers inward toward the base.

An airfoil for a gas turbine engine extends radially relative to an engine axis and includes a plurality of internal channels and a hole connecting two of the plurality of internal channels. The hole extends radially and has a profile that tapers inward toward a radially inner end.

The present summary is provided only by way of example, and not limitation. Other aspects of the present disclosure will be appreciated in view of the entirety of the present disclosure, including the entire text, claims, and accompanying figures.

Figure 1:
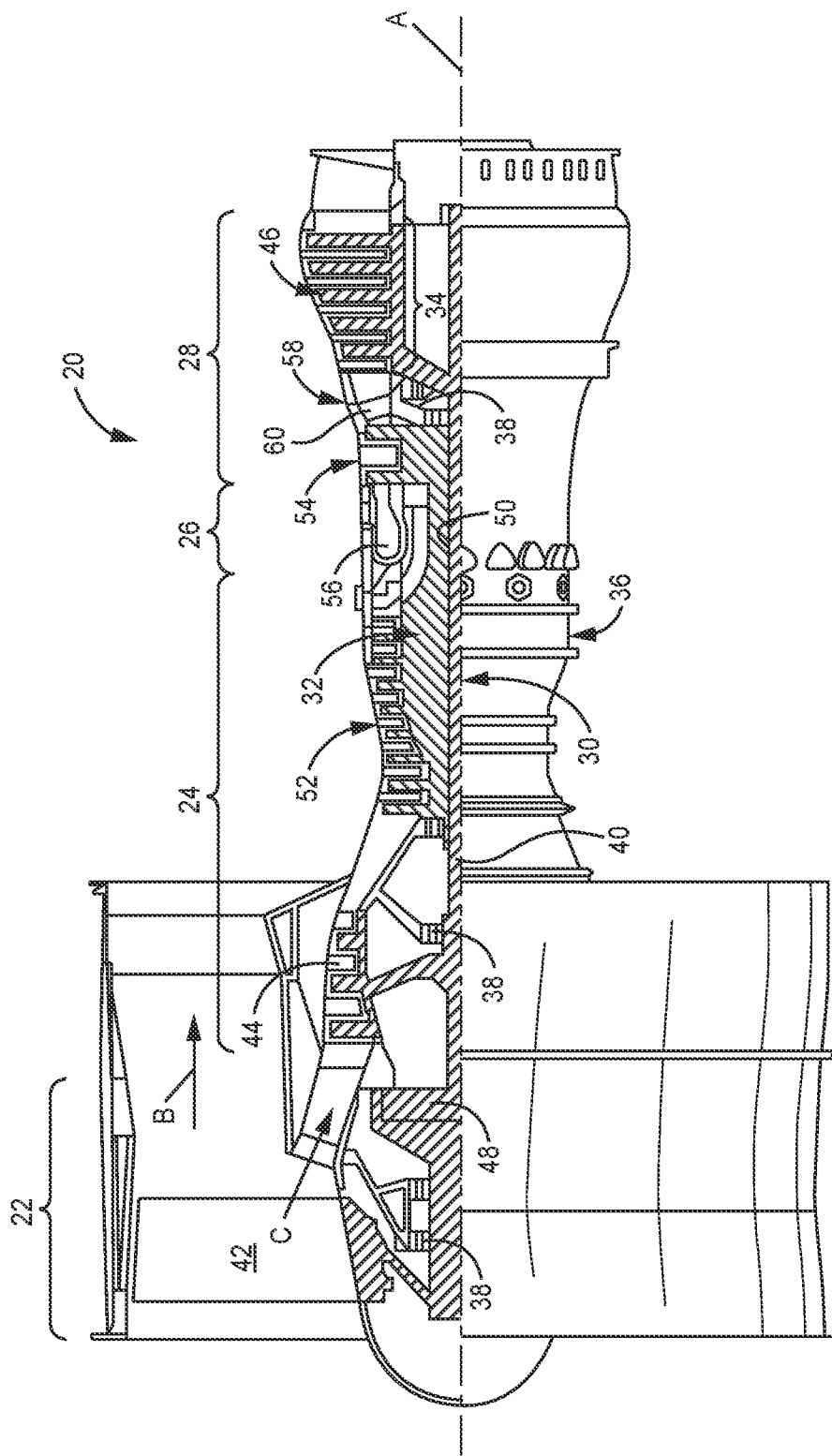
FIG. 1 is a quarter-sectional view of a gas turbine engine.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

FIG. 1 is a quarter-sectional view of gas turbine engine 20 that includes fan section 22, compressor section 24, combustor section 26 and turbine section 28. Fan section 22 drives air along bypass flow path B while compressor section 24 draws air in along core flow path C where air is compressed and communicated to combustor section 26. In combustor section 26, air is mixed with fuel and ignited to generate a high pressure exhaust gas stream that expands through turbine section 28 where energy is extracted and utilized to drive fan section 22 and compressor section 24.

Although the disclosed non-limiting embodiment depicts a turbofan gas turbine engine, it should be understood that the concepts described herein are not limited to use with turbofans as the teachings may be applied to other types of turbine engines; for example a low-bypass turbine engine, or a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

Example engine 20 generally includes low speed spool 30 and high speed spool 32 mounted for rotation about an engine central longitudinal axis A relative to an engine static structure 36 via several bearing systems 38. It should be understood that various bearing systems 38 at various locations may alternatively or additionally be provided.

Low speed spool 30 generally includes inner shaft 40 that connects fan 42 and low pressure (or first) compressor section 44 to low pressure (or first) turbine section 46. Inner shaft 40 drives fan 42 through a speed change device, such as geared architecture 48, to drive fan 42 at a lower speed than low speed spool 30. High-speed spool 32 includes outer shaft 50 that interconnects high pressure (or second) compressor section 52 and high pressure (or second) turbine section 54. Inner shaft 40 and outer shaft 50 are concentric and rotate via bearing systems 38 about engine central longitudinal axis A.

Combustor 56 is arranged between high pressure compressor 52 and high pressure turbine 54. In one example, high pressure turbine 54 includes at least two stages to provide a double stage high pressure turbine 54. In another example, high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of low pressure turbine 46 as related to the pressure measured at the outlet of low pressure turbine 46 prior to an exhaust nozzle.

Mid-turbine frame 58 of engine static structure 36 is arranged generally between high pressure turbine 54 and low pressure turbine 46. Mid-turbine frame 58 further supports bearing systems 38 in turbine section 28 as well as setting airflow entering low pressure turbine 46.

The core airflow C is compressed by low pressure compressor 44 then by high pressure compressor 52 mixed with fuel and ignited in combustor 56 to produce high speed exhaust gases that are then expanded through high pressure turbine 54 and low pressure turbine 46. Mid-turbine frame 58 includes airfoils/vanes 60, which are in the core airflow path and function as an inlet guide vane for low pressure turbine 46. Utilizing vanes 60 of mid-turbine frame 58 as inlet guide vanes for low pressure turbine 46 decreases the length of low pressure turbine 46 without increasing the axial length of mid-turbine frame 58. Reducing or eliminating the number of vanes in low pressure turbine 46 shortens the axial length of turbine section 28. Thus, the compactness of gas turbine engine 20 is increased and a higher power density may be achieved.

Each of the compressor section 24 and the turbine section 28 can include alternating rows of rotor assemblies and vane assemblies (shown schematically) that carry airfoils that extend into the core flow path C. To improve efficiency, static outer shroud seals (shown in FIG. 2), such as a blade outer air seal (BOAS), can be located radially outward from rotor airfoils to reduce tip clearance and losses due to tip leakage.

Figure 2:
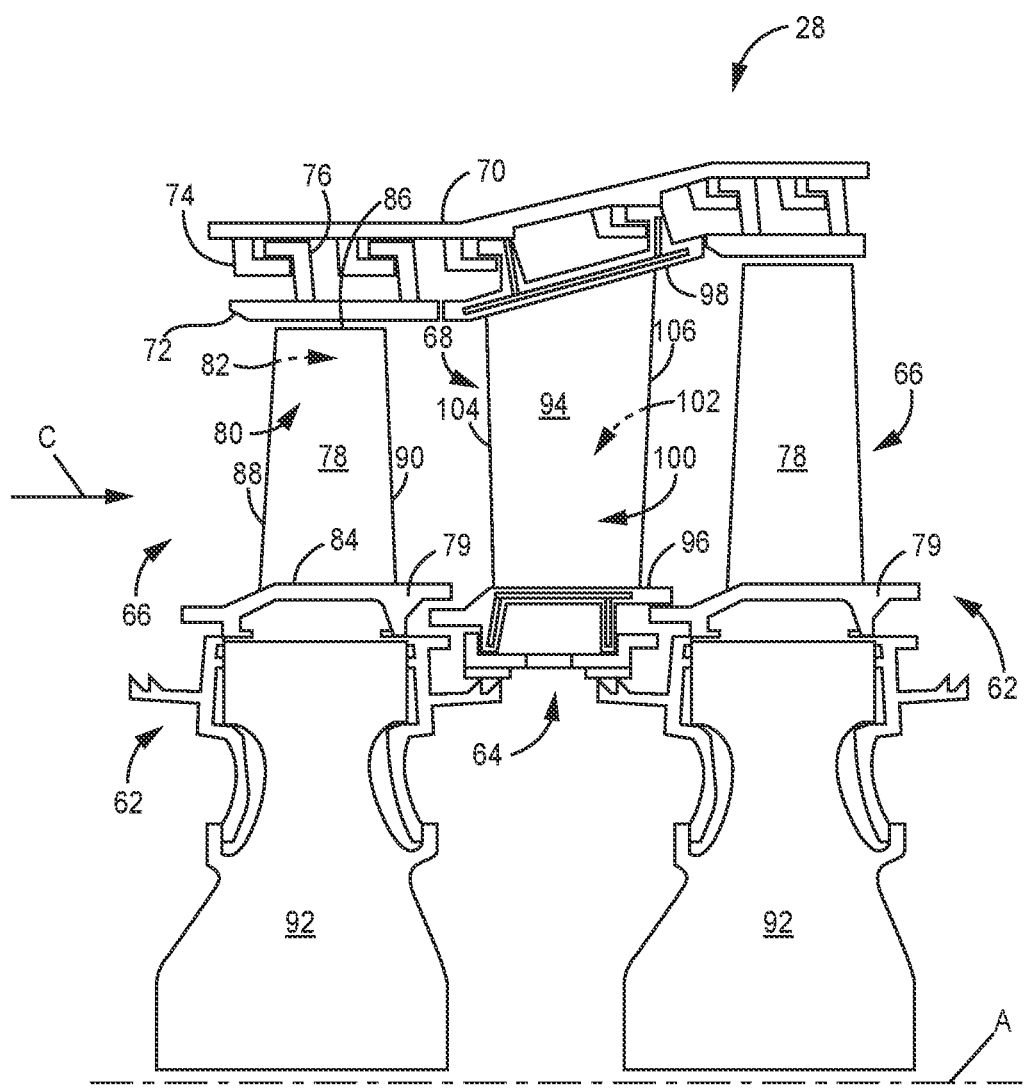
FIG. 2 is a schematized cross-sectional view of a turbine section of the gas turbine engine of FIG. 1.

FIG. 2 is a schematic view of a portion of turbine section 28 that may employ various embodiments disclosed herein. Turbine section 28 includes alternating rows of rotor assemblies 62 and vane assemblies 64. Rotor assemblies 62 include a plurality of rotor blades 66 that extend into core flow path C. Vane assembly 64 includes a plurality of stationary vanes 68 that extend into core flow path C. Turbine section 28 is housed within a case 70, which can include multiple parts (e.g., turbine case, diffuser case, etc.). In various locations, components, such as seals, may be positioned between blades 66, vanes 68, and case 70. For example, BOAS 72 are located radially outward from blade 66. BOAS 72 can include BOAS supports that are configured to fixedly connect or attach BOAS 72 to case 70. For example, case 70 can include a plurality of hooks 74 that engage with BOAS hooks 76 to secure the BOAS 72 between case 70 and a tip of blade 66.

Blades 66 include airfoil body 78 and platform 79. Airfoil body includes pressure side wall 80, suction side wall 82, base region 84, tip 86, leading edge 88, and trailing edge 90. Pressure side wall 80 is disposed opposite suction side wall 82. Pressure side wall 80 and suction side wall 82 each extend radially from base region 84 toward tip 86. As used herein, the term "radial" refers to an orientation perpendicular to engine axis A. Pressure side wall 80 and suction side 82 each extend generally axially and/or tangentially (e.g., with respect to engine axis A) between leading edge 88 and trailing edge 90. Each of base region 84 and tip 86 extend from leading edge 88 to trailing edge 90 at an innermost radial extent and an outermost radial extent of airfoil body 78. Platform 79 joins airfoil body 78 at base region 84. Platform 79 forms an inner boundary of core airflow C. Blades 66 are joined to rotor disks 92. Each bade 66 can include a root portion (not shown) received in rotor disk 92.

Vanes 68 include airfoil body 94, inner diameter platform 96, and outer diameter platform 98. Airfoil body 94 includes pressure side wall 100, suction side wall 102, leading edge 104, and trailing edge 106. Airfoil 94 extends radially from inner diameter platform 96 to outer diameter platform 98. Inner and outer diameter platforms 96, 98 form inner and outer boundaries for core airflow C.

Blades 66 and vanes 68 are hollow bodies with internal cavities. Internal cavities can include one or more cooling circuits defined by a plurality of channels and flow passages configured to direct a cooling fluid. The channels can be separated by walls disposed in the internal cavity. Walls can extend, for example, radially or in a spanwise direction between base region 84 and tip 86 of blades 66, joining pressure side wall 80 and suction side wall 82 to form radially extending channels. Walls can extend a full or partial radial span of airfoils 78 and 94. Walls can additionally or alternatively extend axially or in a chordwise direction between leading edge 88 and trailing edge 90 of blade 66, joining pressure side wall 80 and suction side wall 82 to form axially extending channels. Channels can be fluidly connected via turns or crossover holes through walls to form a cooling fluid flow path through blade 66 or vane 68. Cooling fluid can be provided to the internal cavity of blades 66 via one or more openings in a base of blade 66 (e.g., through a root of the blade). A cooling fluid supply channel can extend through disk 92 and a root of blade 66 to deliver cooling fluid to the internal cooling circuit. Cooling fluid can be provided to the internal cavity of vanes 68 via one or more openings in outer diameter platform 98.

Figure 3:
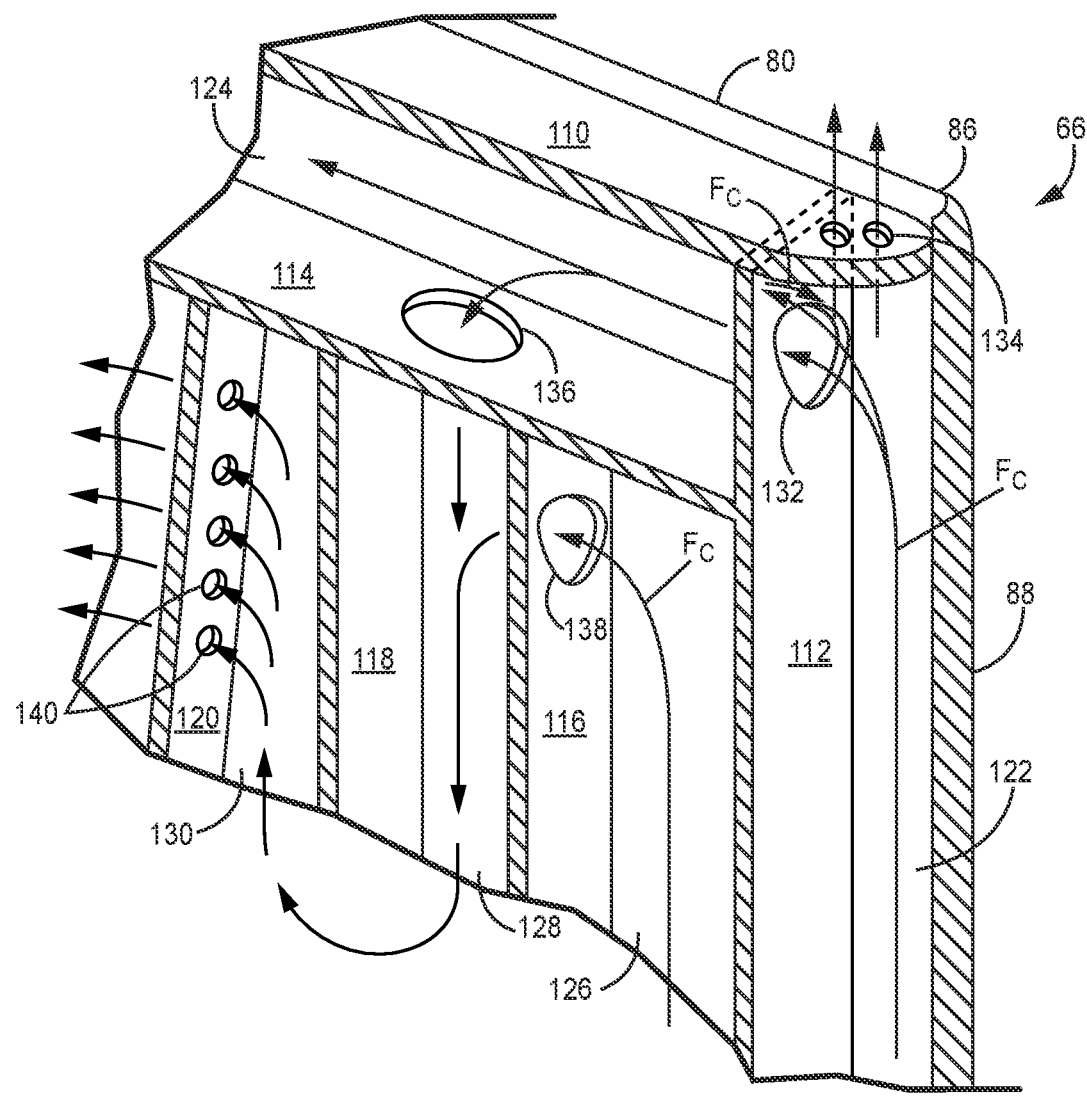
FIG. 3 is a schematized partial cutaway view of a simplified airfoil of the turbine section of FIG. 2.

FIG. 3 is a schematic partial cutaway view of one embodiment of blade 66 including an internal cooling circuit. Blade 66, pressure side wall 80, tip 86, leading edge 88, tip wall 110, leading edge partition wall 112, tip partition wall 114, first internal partition wall 116, second internal partition wall 118, third internal partition wall 120, leading edge channel 122, tip channel 124, first internal channel 126, second internal channel 128, third internal channel 130, leading edge channel crossover hole 132, tip holes 134, tip channel crossover hole 136, internal channel crossover hole 138, trailing edge crossover holes 140, and cooling flow Fc are shown. Suction side wall 82 is removed to show internal features. FIG. 3 is a schematic representation of an internal cooling circuit. The internal cooling circuit may include additional features not shown and/or alternative features or configurations as described herein.

Tip wall 110 extends from leading edge 88 to trailing edge 90 (shown in FIG. 2) and from pressure side wall 80 to suction side wall 82 (shown in FIG. 2) to define a radially outermost boundary of the internal cooling circuit of blade 66. Tip wall 110 can include tip holes 134 connecting the internal cooling circuit to the exterior of blade 66 to exhaust cooling fluid from the internal cooling circuit. Tip holes 134 can be disposed adjacent leading edge 88 to exhaust the cooling fluid from leading edge channel 122. Tip wall 110 can be radially recessed from tip 86 (i.e., a radially outermost extent of pressure side wall 80 and suction side wall 82) to form a tip squealer pocket extending from leading edge 88 toward trailing edge 90 (shown in FIG. 2).

Leading edge partition wall 112 extends radially or in a spanwise direction from base region 84 to tip wall 110. Leading edge partition wall 112 joins suction side wall 82 to pressure side wall 80. Leading edge partition wall 112 is axially spaced from leading edge 88, such that leading edge 88, leading edge partition wall 112, pressure side wall 80, and suction side wall 82 define a radially extending leading edge channel 122 through which a cooling fluid can be provided. Leading edge partition wall 112 includes leading edge channel crossover hole 132. Leading edge channel crossover hole 132 is disposed adjacent to tip wall 110 and configured to convey cooling fluid from leading edge channel 122 to tip channel 124. Leading edge crossover hole 132 is spaced from tip wall 110, pressure side wall 80, and suction side wall 82 (shown in FIG. 2).

Tip partition wall 114 extends axially or in a chordwise direction from leading edge partition wall 112 toward trailing edge 90 (shown in FIG. 2). Tip partition wall 114 is radially spaced from tip wall 110. Tip partition wall 114 adjoins pressure side wall 80, suction side wall 82 and leading edge partition wall 112. Tip partition wall 114, together with tip wall 110, leading edge partition wall 112, and pressure and suction side walls 80, 82 form tip channel 124 through which cooling fluid can be provided. Tip partition wall 114 includes tip channel crossover hole 136. Tip channel crossover hole 136 is disposed to convey cooling fluid from tip channel 124 to second internal channel 128 of the internal cooling circuit provided between first and second internal partition walls 116 and 118. Tip channel crossover hole 136 is spaced from pressure side wall 80, suction side wall 82, first internal partition wall 116, and second internal partition wall 118. Tip channel crossover hole 136 can provide better stress distribution on tip partition wall 114 than provided with discontinuous tip partition walls extending to first and second internal partition walls 116 and 118. Tip channel crossover hole 136 can have a circular or oval shape and can be centered on tip partition wall 114 between pressure side wall 80 and suction side wall 82.

First internal partition wall 116, second internal partition wall 118, and third internal partition wall 120 extend radially or in a spanwise direction from tip partition wall 114 toward base region 84 and join pressure side wall 80 and suction side wall 82 (shown in FIG. 2). Together, first internal partition wall 116, second internal partition wall 118, and third internal partition wall 120 can form a serpentine cooling circuit in blade 66 through which cooling fluid can be provided. Together, first internal partition wall 116, leading edge partition wall 112, tip partition wall 114, and pressure and suction side walls 80, 82 define first internal channel 126. Leading edge partition wall 112 can fully separate leading edge channel from first internal channel thereby separating a cooling flow Fc through leading edge channel 122 from a cooling flow Fc through first internal channel 126. First internal channel 126 is immediately aft of leading edge channel 122. As used herein, "aft" refers to an axial location with respect to engine axis A and a direction of core airflow C through engine 20. Cooling fluid can be separately fed to leading edge channel 122 and first internal channel 126 from a root portion of blade 66.

Together, second internal partition wall 118, tip partition wall 114, first internal partition wall 116, and pressure and suction side walls 80, 82 define second internal channel 128 in the body portion of airfoil 78. Second internal channel 128 is disposed immediately aft of first internal channel 126. First and second internal channels 126 and 128 are fluidly connected by internal channel crossover hole 138. Internal channel crossover hole 138 is disposed in first internal partition wall 116. Internal channel crossover hole 138 is disposed adjacent to tip partition wall 114. First internal partition wall can extend to base region 84 (shown in FIG. 2). and, specifically, to a cooling fluid inlet (not shown) such that first internal channel 126 is separated from second internal channel along a length of first and second internal channels 126 and 128 from internal channel crossover hole 138 to an innermost radial extent.

Second internal partition wall 118 extends from tip partition wall 114 toward base region 84 (shown in FIG. 2). Together, second internal partition wall 118, tip partition wall 114, third internal partition wall 120, and pressure and suction side walls 80, 82 define third internal channel 130. Second internal partition wall 118 extends a partial length of the internal cavity of blade 66 such that second internal channel 128 and third internal channel 130 are fluidly connected at an innermost radial extent. Third internal partition wall 120 can include a plurality of trailing edge crossover holes 140 configured to convey cooling fluid to a trailing edge cavity or exhaust cooling fluid from the internal cooling circuit through trailing edge 90 (shown in FIG. 2).

Cooling fluid can be provided to the internal cooling circuit of blade 66 from one or more cooling channels in a root of blade 66. As shown in FIG. 3, cooling flow Fc can be received in each of leading edge channel 122 and first internal channel 126. Cooling flow Fc moves in a radial or spanwise direction toward tip wall 110. Cooling fluid Fc from leading edge channel 122 is conveyed to tip channel 124 via leading edge channel crossover hole 132. A portion of cooling flow Fc through leading edge channel 122 is exhausted through tip holes 134. Cooling flow Fc moves in an axial or chordwise direction in tip channel 124. A portion of cooling flow Fc from tip channel can be conveyed to second internal channel 128 through tip channel crossover hole 136. A portion of cooling flow Fc can be exhausted through trailing edge 90 (shown in FIG. 2). Cooling flow Fc supplied to first internal channel 126 moves in a radial direction toward tip partition wall 114. Cooling flow Fc in first internal channel 126 is conveyed to second internal channel 128 via internal channel crossover hole 138 near tip partition wall 114. Cooling flow Fc moves in a radial direction toward base region 84 (shown in FIG. 2) of blade 66. Cooling flow Fc turns at an innermost radial extent of second internal partition wall 118 and is directed radially outward toward tip partition wall 114 in third internal channel 130. Cooling flow Fc in third internal channel 130 can be directed to trailing edge 90 (shown in FIG. 2). via trailing edge crossover holes 140.

Leading edge partition wall 112 extends fully to tip wall 110 to provide internal cooling of tip 86 at leading edge 88. This region can experience high thermal loads and mechanical stress during operation. As illustrated in FIG. 3, a portion of cooling flow Fc impinges leading edge partition wall 112 above and around leading edge channel crossover hole 132, providing back pressure in the region of tip 86. The additional cooling provided by extending leading edge partition wall 112 to tip wall 110 can reduce a local thermal mechanical strain in this region.

Leading edge channel crossover hole 132 has an area sized to provide a desired cooling flow Fc to tip channel 124. Leading edge channel crossover hole 132 is sized to convey substantially all or the majority of cooling fluid in leading edge channel 122 to tip channel 124. Leading edge channel crossover hole 132 has a maximum size smaller than a forward most area of tip channel 124 to provide back pressure cooling of the tip region at leading edge 88. Leading edge channel crossover hole 132 has a minimum size determined based on a desired pressure drop across hole 132. As used herein, "substantially all" refers to cooling fluid Fc not used for film cooling of external surfaces or tip cooling. As shown in FIG. 3, a portion of cooling flow Fc is exhausted from leading edge channel 122 through tip holes 134. A small portion of cooling flow Fc can also be used for film cooling in the region of leading edge 88, exiting leading edge channel 122 through film cooling holes (not shown). Leading edge channel crossover hole 132 can be disposed closer to tip wall 110 than to tip partition wall 114. Leading edge channel crossover hole 132 is spaced radially inward of tip wall 110 a distance selected to provide effective back pressure and cooling in the tip region at leading edge 88.

Internal channel crossover hole 138 is disposed adjacent to tip partition wall 114. Internal channel crossover hole 138 can be spaced from tip partition wall to provide back pressure cooling of the outermost radial extent of first internal channel 126 provided by cooling flow impinging first internal partition wall 116 above internal channel crossover hole 138. Internal channel crossover hole 138 has an area sized to provide a desired cooling flow Fc to second internal channel 128. Internal channel crossover hole 138 is sized to convey substantially all cooling fluid received in first internal channel 126 to second internal channel 128.

Both leading edge channel crossover hole 132 and internal channel crossover hole 138 are shaped to provide effective flow-through cooling while reducing stress. Leading edge channel crossover hole 132 and internal channel crossover hole 138 have a non-circular shape. In some general cases, leading edge channel crossover hole 132 and internal channel crossover hole 138 have a shape that is asymmetric as a function of height, with a major axis along a width dimension (i.e., transverse to the radial direction) that is situated in the radially outer half of the hole. Specifically, leading edge channel crossover hole 132 and internal channel crossover hole 138 have an oval shape or shape of an isosceles triangle with rounded corners and sides (e.g., guitar pick shape) with side walls that taper inward from a bulbous radially outer end to a radially inner end as described further in FIGS. 4A-4D. Leading edge channel crossover hole 132 and internal channel crossover hole 138 are shaped to provide increased wall material in areas of high mechanical stress without reducing an area required to achieve a desired cooling fluid flow.

FIGS. 4A-4D show front views of different embodiments of leading edge channel crossover hole 132 and/or internal channel crossover hole 138. As shown in FIGS. 4A-4D, crossover holes 150, 160, 170, 180 can vary in height H, width W, and radii depending on space availability, desired area, and structural requirements. Reference to radially outer ends and radially inner ends refers to a location along leading edge partition wall 112 and first internal partition wall 116. Radially outer ends are positioned adjacent to tip wall 110 and tip partition wall 114. Radially inner ends are opposite radially outer ends. Crossover holes 150, 160, 170, 180 can have a guitar pick or oval shape with radially outer ends defined by three curves having a radially outer radius separated by two side radii and a radially inner end defined by a single curve forming an inner radius, which is smaller than the outer radius. Crossover holes 150, 160, 170, 180 can be symmetric about a radially extending axis.

Figure 4A:
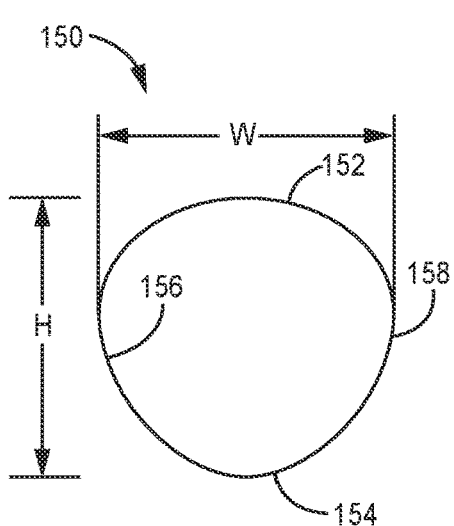
FIGS. 4A-4D are front views of different embodiments of a crossover hole in the cooling circuit of the airfoil of FIG. 3.
Figure 4B:
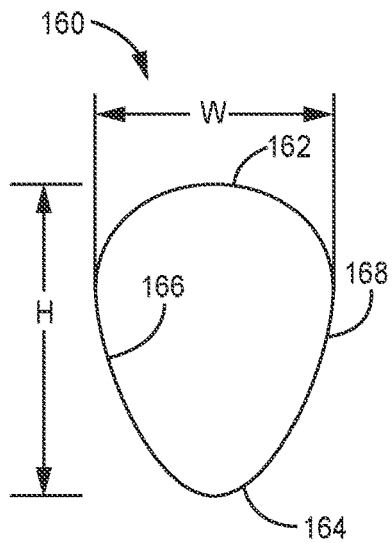
Figure 4C:
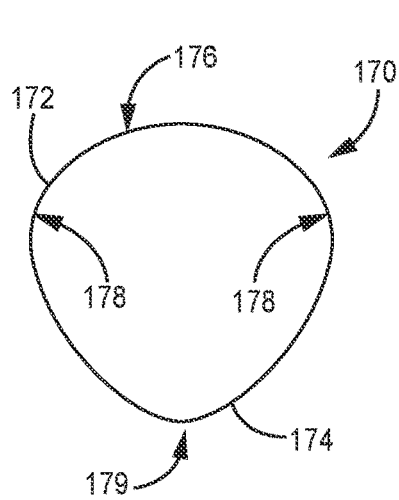
Figure 4D:
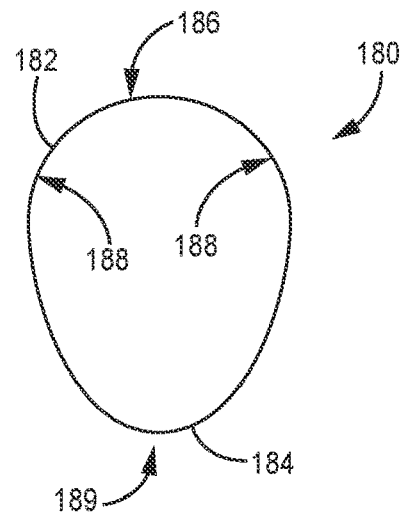

FIG. 4A shows crossover hole 150 having radially outer end 152, radially inner end 154, first side 156, second side 158, width W, and height H. FIG. 4B shows crossover hole 160 having radially outer end 162, radially inner end 164, first side 166, second side 168, width W, and height H. FIGS. 4A and 4B are provided to show how height H and width W can be varied while maintaining a desired area for cooling fluid flow. FIG. 4C shows crossover hole 170 having radially outer end 172, radially inner end 174, outer radius 176, side radii 178, and inner radius 179. FIG. 4D shows crossover hole 180 having radially outer end 182, radially inner end 184, outer radius 186, side radii 188, and inner radius 189. FIGS. 4C and 4D are provided to show how radii can vary to provide additional wall thickness (i.e., wall area around radially inner ends 174, 184).

As previously discussed, height H, width W, and radii can be varied based on space availability, desired area for cooling fluid flow, and structural requirements. During operation of blade 66 (shown in FIG. 3), higher mechanical stress can be observed at the radially inner end of circular or elliptical crossover holes. Crossover holes according to the present disclosure are designed to minimize mechanical stress by increasing the wall thickness adjacent to the inner end of the crossover holes. This is accomplished by reducing a radius of the crossover hole at the radially inner end and increasing the radius of the crossover hole where mechanical stress is lower, at the radially outer end as shown in FIGS. 4A-4D.

Figure 5:
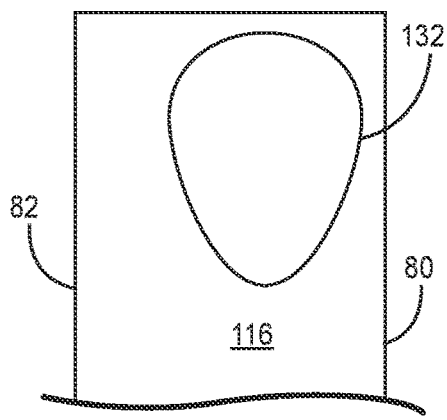
FIG. 5 is a front view illustrating another embodiment of a crossover hole and its positioning within the cooling circuit of the airfoil of FIG. 3.

FIG. 5 shows leading edge channel crossover hole 132 of FIG. 3 biased toward pressure side wall 80 of blade 66. During operation of blade 66, higher mechanical stress can be observed at suction side wall 82 of blade 66 adjacent to leading edge partition wall 112. Leading edge channel crossover hole 132 can be disposed closer to pressure side wall 80 to provide additional leading edge partition wall thickness in a region adjacent to suction side wall 82.

As shown in FIG. 3, internal channel crossover hole 138 can be centered on first internal partition wall 116 between pressure side wall 80 and suction side wall 82 absent increased mechanical stress on suction side wall 82 adjacent to internal channel crossover hole 138. Centering internal channel 138 can improve ease of manufacturing.

Figure 6:
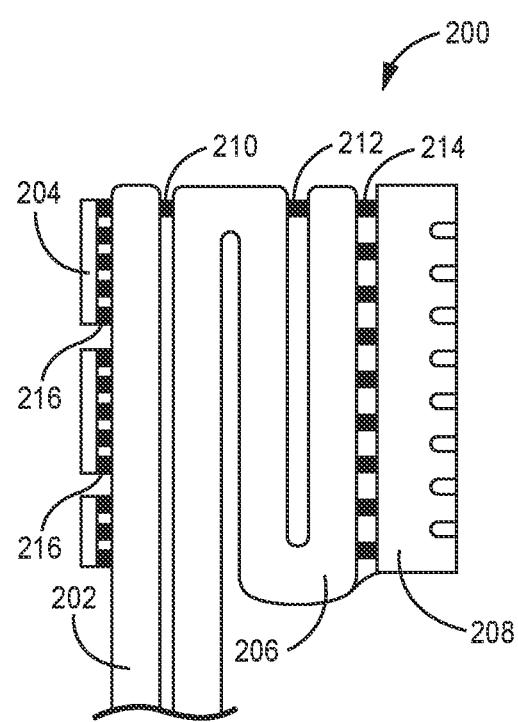
FIG. 6 is a schematic view of an alternate cooling circuit of an airfoil of FIG. 2.

FIG. 6 is a schematic view of an alternate example of internal cavities of blade 66. FIG. 6 shows cooling circuit 200, leading edge channel 202, leading edge box car passages 204, internal passage 206, trailing edge channel 208, and crossover holes 210, 212, 214, 216. Leading edge channel 202, leading edge box car passages 204, internal passage 206, trailing edge channel 208, and crossover holes 210, 212, 214, 216 are flow passages or cooling cavities that are disposed adjacent to walls of blade 66. The cavities can be formed from a solid ceramic core that is leached out of a metal casting of blade 66.

Crossover holes 210, 212, 214, 216 can be provided to connect cooling channels to form a single core for casting. Leading edge channel 202 can be connected to internal passage 206 by crossover hole 210 disposed at a radially outer end. Internal channels of internal passage 206 can be connected by crossover hole 212 at a radial outer end. Crossover hole 212 can provide additional cooling fluid to a tip region of trailing edge 90 (shown in FIG. 2). Internal passage 206 can be connected to trailing edge channel 208 by crossover holes 214, and leading edge channel 202 can be connected to boxcar passages 204 by crossover holes 216. Crossover holes 210, 212, 214, 216 can have a non-circular shape as shown in FIGS. 3-5 and described with respect thereto. The position, size, and shape can vary depending on space availability, desired area for cooling flow, and structural requirements. Each of crossover holes 210, 212, 214, 216 can have an oval or guitar pick shape with a smaller radius at a radially inner end and larger radius at a radially outer end as previously described.

The disclosed non-circular crossover holes can improve airfoil cooling while reducing stress. While the discussion is focused on cooling circuits of a rotating blade, crossover holes according to the present disclosure can be used in cooling circuits for stationary vanes. The orientation of the crossover holes may vary depending on the location of a stress concentration.

Discussion of Possible Embodiments

The following are non-exclusive descriptions of possible embodiments of the present invention.

An airfoil for a gas turbine engine is configured to extend in a radial direction relative to an engine axis from an inner diameter to an outer diameter. The airfoil comprises a body having a base disposed at the inner diameter, a tip disposed at the outer diameter, a leading edge, a trailing edge, a pressure side wall extending between the leading edge and the trailing edge and between the base and the tip, and a suction side wall extending between the leading edge and the trailing edge and between the base and the tip. The body defines an interior cavity. A first wall is disposed in the interior cavity, extends radially, and adjoins the pressure side wall and the suction side wall to form a first cooling channel. A first hole through the first wall connects the first cooling channel to a second cooling channel. The first hole has a profile that tapers inward toward the base.

The airfoil of the preceding paragraph can optionally include, additionally and/or alternatively, any one or more of the following features, configurations and/or additional components:

In an embodiment of the airfoil of the preceding paragraph, the first hole can have a tapering oval shape extending radially and described by inner radius at a radially inner end and an outer radius at a radially outer end, wherein the inner radius is less than the outer radius.

In an embodiment of the airfoil of any of the preceding paragraphs, side walls of the first hole can taper inward from the outer radius to the inner radius, such that a major axis of the first hole transverse to the radial direction is disposed in a radially outer half of the first hole.

In an embodiment of the airfoil of any of the preceding paragraphs, the first hole can be symmetric about a radially extending axis.

In an embodiment of the airfoil of any of the preceding paragraphs, the first hole can be disposed closer to the pressure side wall than to the suction side wall.

In an embodiment of the airfoil of any of the preceding paragraphs, the airfoil can further include a second wall disposed in the interior cavity and extending axially from the first wall toward the trailing edge, with the second wall adjoining the pressure side wall and the suction side wall to form the second cooling channel. The first hole connects the first cooling channel and the second cooling channel.

In an embodiment of the airfoil of any of the preceding paragraphs, the second cooling channel can be disposed adjacent to the tip.

In an embodiment of the airfoil of any of the preceding paragraphs, the first hole can be disposed between the second wall and the tip and wherein the first hole is disposed closer to the tip than to the second wall.

In an embodiment of the airfoil of any of the preceding paragraphs, the first cooling channel can be disposed adjacent to the leading edge.

In an embodiment of the airfoil of any of the preceding paragraphs, the airfoil can further include a third wall disposed in the interior cavity. The third wall can extend radially and adjoin the pressure side wall, the suction side wall, and the second wall to form a third cooling channel between the first wall and the third wall. A second hole can be provided through the third wall. The second hole can have a profile that tapers inward toward the base.

In an embodiment of the airfoil of any of the preceding paragraphs, the airfoil can further include a fourth wall disposed in the interior cavity. The fourth wall can extend radially and adjoin the pressure side wall, the suction side wall, and the second wall to form a fourth cooling channel between the third wall and the fourth wall. The second hole can connect the third cooling channel and the fourth cooling channel.

In an embodiment of the airfoil of any of the preceding paragraphs, the second hole can be disposed adjacent to the second wall.

In an embodiment of the airfoil of any of the preceding paragraphs, the second hole can be centered between the suction side wall and the pressure side wall.

In an embodiment of the airfoil of any of the preceding paragraphs, the airfoil can further include a third hole through the second wall. The third hole can connect the second cooling to the fourth cooling channel.

In an embodiment of the airfoil of any of the preceding paragraphs, the first hole, the second hole, and the third hole can be sized to convey substantially all or a majority of cooling fluid flow from the first cooling channel to the second cooling channel, from the third cooling channel to the fourth cooling channel, and from the second cooling channel to the fourth cooling channel, respectively.

In an embodiment of the airfoil of any of the preceding paragraphs, the airfoil can be a rotor blade.

An airfoil for a gas turbine engine extends radially relative to an engine axis and includes a plurality of internal channels and a hole connecting two of the plurality of internal channels. The hole extends radially and has a profile that tapers inward toward a radially inner end.

The airfoil of the preceding paragraph can optionally include, additionally and/or alternatively, any one or more of the following features, configurations and/or additional components:

In an embodiment of the preceding paragraph, the hole can have an oval shape having an inner radius at a radially inner end that is less than an outer radius at a radially outer end.

In an embodiment of the airfoil of any of the preceding paragraphs, the hole can be disposed adjacent to radially outer ends of the two channels.

In an embodiment of the airfoil of any of the preceding paragraphs, the hole can be sized to convey substantially all or a majority of cooling fluid flow in one of the two channels to the other of the two channels.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An airfoil for a gas turbine engine, the airfoil configured to extend in a radial direction relative to an engine axis from an inner diameter to an outer diameter and comprising:
   a body having a base disposed at the inner diameter, a tip disposed at the outer diameter, a leading edge, a trailing edge, a pressure side wall extending between the leading edge and the trailing edge and between the base and the tip, and a suction side wall extending between the leading edge and the trailing edge and between the base and the tip; wherein the body defines an interior cavity;
   a first wall disposed in the interior cavity, the first wall extending radially and adjoining the pressure side wall and the suction side wall to form a first cooling channel; and
   a first hole through the first wall, the first hole connecting the first cooling channel to a second cooling channel, wherein the first hole has a tapering oval shape extending radially and tapering inward toward the base with an inner radius at a radially inner end and an outer radius at a radially outer end, wherein the inner radius is less than the outer radius.

2. The airfoil of claim 1, wherein side walls of the first hole taper inward from the outer radius to the inner radius, such that a major axis of the first hole transverse to the radial direction is disposed in a radially outer half of the first hole.

3. The airfoil of claim 1, wherein the first hole is symmetric about a radially extending axis.

4. The airfoil of claim 1, wherein the first hole is disposed closer to the pressure side wall than to the suction side wall.

5. The airfoil of claim 1, and further comprising:
a second wall disposed in the interior cavity and extending axially from the first wall toward the trailing edge, the second wall adjoining the pressure side wall and the suction side wall to form the second cooling channel;
wherein the first hole connects the first cooling channel and the second cooling channel.

6. The airfoil of claim 5, wherein the second cooling channel is disposed adjacent to the tip.

7. The airfoil of claim 6, wherein the first hole is disposed between the second wall and the tip and wherein the first hole is disposed closer to the tip than to the second wall.

8. The airfoil of claim 5, wherein the first cooling channel is disposed adjacent to the leading edge.

9. The airfoil of claim 5, and further comprising:
a third wall disposed in the interior cavity, the third wall extending radially and adjoining the pressure side wall, the suction side wall, and the second wall to form a third cooling channel between the first wall and the third wall; and
a second hole through the third wall, wherein the second hole has a profile that tapers inward toward the base.

10. The airfoil of claim 9, and further comprising:
a fourth wall disposed in the interior cavity, the fourth wall extending radially and adjoining the pressure side wall, the suction side wall, and the second wall to form a fourth cooling channel between the third wall and the fourth wall;
wherein the second hole connects the third cooling channel and the fourth cooling channel.

11. The airfoil of claim 10, wherein the second hole is disposed adjacent to the second wall.

12. The airfoil of claim 11, wherein the second hole is centered between the suction side wall and the pressure side wall.

13. The airfoil of claim 10, and further comprising a third hole through the second wall, the third hole connecting the second cooling channel to the fourth cooling channel.

14. The airfoil of claim 13, wherein the first hole, the second hole, and the third hole are sized to convey a majority of cooling fluid flow from the first cooling channel to the second cooling channel, from the third cooling channel to the fourth cooling channel, and from the second cooling channel to the fourth cooling channel, respectively.

15. The airfoil of claim 1, wherein the airfoil is a rotor blade.

16. An airfoil for a gas turbine engine, the airfoil extending radially relative to an engine axis and comprising:
a plurality of internal channels; and
a hole connecting two of the plurality of internal channels, the hole extending radially and having a profile that tapers inward toward a radially inner end, wherein the hole has an oval shape having an inner radius at a radially inner end that is less than an outer radius at a radially outer end.

17. The airfoil of claim 16, wherein the hole is disposed adjacent to radially outer ends of the two channels.

18. The airfoil of claim 16, wherein the hole is sized to convey a majority of cooling fluid flow in one of the two channels to the other of the two channels.

* * * * *